US011204145B2

(12) United States Patent
Kronberger et al.

(10) Patent No.: US 11,204,145 B2
(45) Date of Patent: Dec. 21, 2021

(54) MOTOR VEHICLE HEADLAMP HAVING AN ELLIPSOID REFLECTOR AND A COLLIMATOR

(71) Applicant: ZKW Group GmbH, Wieselburg (AT)

(72) Inventors: Florian Kronberger, Wieselburg/Erlauf (AT); Josef Hechenberger, Mondsee (AT); Stephan Arlinghaus, Oberkochen (DE)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 17/265,112

(22) PCT Filed: Aug. 1, 2019

(86) PCT No.: PCT/EP2019/070746

§ 371 (c)(1),
(2) Date: Feb. 1, 2021

(87) PCT Pub. No.: WO2020/025740

PCT Pub. Date: Feb. 6, 2020

(65) Prior Publication Data

US 2021/0317965 A1 Oct. 14, 2021

(30) Foreign Application Priority Data

Aug. 2, 2018 (EP) .................................... 18187022

(51) Int. Cl.

| | |
|---|---|
| ***B60Q 1/00*** | (2006.01) |
| ***F21S 41/32*** | (2018.01) |
| ***F21S 41/24*** | (2018.01) |
| ***F21S 41/25*** | (2018.01) |
| ***F21S 41/43*** | (2018.01) |
| ***F21V 9/30*** | (2018.01) |
| *F21Y 115/30* | (2016.01) |
| *F21W 102/135* | (2018.01) |

(52) U.S. Cl.

CPC ............ *F21S 41/321* (2018.01); *F21S 41/24* (2018.01); *F21S 41/25* (2018.01); *F21S 41/43* (2018.01); *F21V 9/30* (2018.02); *F21W 2102/135* (2018.01); *F21Y 2115/30* (2016.08)

(58) Field of Classification Search

None

See application file for complete search history.

(56) References Cited

U.S. PATENT DOCUMENTS

| | | | |
|---|---|---|---|
| 2014/0009938 | A1 | 1/2014 | Hossfeld |
| 2014/0016343 | A1 | 1/2014 | Brendle |
| 2018/0180241 | A1 | 6/2018 | Huber et al. |

FOREIGN PATENT DOCUMENTS

| | | | |
|---|---|---|---|
| DE | 102013227194 | A1 | 7/2015 |
| DE | 102014200368 | A1 | 1/2016 |
| FR | 3038695 | A1 | 1/2017 |

OTHER PUBLICATIONS

International Search Report for PCT/EP2019/070746, dated Nov. 4, 2019. (2 pages).

European Search Report for EP Application No. 18187022, dated Jan. 9, 2019.

*Primary Examiner* — Elmito Breval

(74) *Attorney, Agent, or Firm* — Eversheds Sutherland (US) LLP

(57) ABSTRACT

The invention relates to a motor vehicle headlamp (100) containing an ellipsoid reflector (130), which allows light coupled in from a light source (100) to exit through a reflector light exit opening (132), a collimator (140) and a projection optical unit (160). The collimator (140) is designed to collimate the incident light beam coming from the ellipsoid reflector (130) and to direct the same toward a first image plane (170). The projection optical unit (160) projects a light image produced by the light beam in the emission direction of the motor vehicle headlamp (100) in accordance with a second image plane (180) of the projection optical unit (160). The first image plane (170) and the second image plane (180) intersect or overlap with one another. In the beam path of the light beam, an optical element (150) having at least one optically active edge (151) is arranged between the collimator (140) and the projection optical unit (160) in such a way that the first and/or second image plane (170, 180) runs through the optical element (150), in Order to mask a part of the light beam and to guide another part to the projection optical unit (160).

18 Claims, 5 Drawing Sheets

MOTOR VEHICLE HEADLAMP HAVING AN ELLIPSOID REFLECTOR AND A COLLIMATOR

The invention relates to a motor vehicle headlamp.

In the development of conventional headlamp systems, the desire to be able to project a light image onto the carriageway is ever more prominent, wherein the efficiency in light generation is essential for the quality and the economic viability of a motor vehicle headlamp. Various headlamps, for example main and auxiliary headlamps, are used to this end, which generate different light images on the carriageway. The term "carriageway" is here used for simplified representation, as whether a light image is actually located on the carriageway or even extends beyond the same of course depends on the local conditions. In principle, the light image, in the sense used, corresponds to a projection onto a vertical surface in accordance with the relevant standards, which relate to automotive illumination technology.

One example of a motor vehicle headlamp of the type considered here is disclosed in AT 511760 B1 of the applicant; the optical components of which are shown in a schematic form in FIG. 1. The headlamp 10 of conventional type generates a light distribution for a partial main-beam function for example. To this end, the headlamp comprises a light source 11, which is held and positioned in a light module 12 (symbolized by a circle in FIG. 1), a collimator optical element 40, a diaphragm 50 and a projection optical element, which is realized here e.g. as a single lens 60. The light emanating from the light source 11 is coupled into the collimator optical element 40 at a collimator light entrance surface 41. The collimator optical element, e.g. constructed as a collimator in the form of a light conductor finger, is used to bundle the light and allow it to exit through a collimator light exit surface 42. The collimator 40 is positioned in such a manner that the light source 12 is located at the collimator entrance focal point; the diaphragm 50 is arranged in such a manner in relation to the collimator 40 that it is located in the collimator exit focal length. As a result, a light image is shaped in the plane of the diaphragm 50 and the diaphragm is configured to mask out a portion of the light image. A projection optical element 60 is provided downstream of the diaphragm 50 in the beam path, which projection optical element is located at a distance from the light image at the location of the diaphragm 50, wherein this distance corresponds to the focal length (more precisely: entrance focal length) of the projection optical element 60. The projection optical element 60 is configured to project the light image in the radiation direction of the motor vehicle headlamp 10 and thus to generate a light distribution of the desired type on a projection surface (e.g. road).

In motor vehicle headlamps of this type, the light generated by light sources should be shaped, bundled and projected as a light image onto the carriageway as efficiently as possible. Often in this case, lenses are either too expensive or limiting due to their transmission properties. In addition, in certain arrangements, an undesired chromatic aberration may occur. A further significant problem is the accessibility of the light source for optical components, which is often difficult due to the structure of the light source and its supply components (electrical supply lines, cooling). Associated with this is the generation of heat in the light source, particularly if this is a laser light source, as a result of which other components of the headlamp, particularly a light-shaping component, such as a collimator optical element, which has to be positioned close to the light source as a consequence of the required geometry of the optical element, may be damaged by heating.

It is the object of the invention to overcome the disadvantages mentioned.

The object is achieved by means of a motor vehicle headlamp, which comprises:

a light source, which is configured to emit light, and an ellipsoid reflector having a first and a second focal point, wherein the ellipsoid reflector is configured to bundle the light coupled in from the light source via the first focal point to the second focal point and allow the light to exit through a reflector light exit opening, and a collimator, which has a collimator light entrance surface and a collimator light exit surface, wherein the reflector light exit opening is arranged upstream of the collimator light entrance surface in an entrance focal length of the collimator, wherein a first image plane is assigned to the collimator in an exit focal length of the collimator, and wherein the collimator is configured to bundle the light exiting from the ellipsoid reflector in the direction of the first image plane to form a light beam bundle and to shape a light image there, that is to say in the first image plane, and a projection optical element, to which a second image plane is assigned in an entrance focal length, wherein the first image plane and the second image plane intersect or overlap one another, wherein the projection optical element is configured to project a light image (generated by the light beam bundle and preferably placed in the region of the second image plane) in the radiation direction of the motor vehicle headlamp, wherein an optical element having at least one optically active edge is positioned in the beam path between the collimator and the projection optical element, which optical element is configured to delimit the light beam bundle by means of the at least one optically active edge, so that the light beam bundle partially reaches the projection optical element and the optical element is arranged in such a manner that the first and/or the second image plane lies on the optical element or runs through the optical element.

In other words, the optical element is set up partially to reflect or to absorb the light beam bundle and partially allow the light beam bundle to pass.

Using an ellipsoid reflector, a highly efficient light collection can be conceived in a motor vehicle headlamp, as the reflector surrounds the light source and thus a very large solid angle is available for the focal point or the light collection. This can advantageously be combined with the Lambertian radiation characteristic of a laser light source in particular. In addition, the ellipsoid reflector creates a virtual light source, namely at the second focal point, which virtual light source is better accessible geometrically for the optical system adjoining the reflector, particularly the projection optical element, than the actual light source. As a consequence, it is possible to use a collimator of considerably smaller size. Due to the use of reflective components for the reflector and collimator, chromatic aberration is additionally avoided. Furthermore, the ellipsoid reflector enables the creation of a spatial distance between the light source and the collimator optical element and thus the problem of heat generation at the (laser) light source is mitigated, as a better dissipation of the heat is ensured without impairment of the optical components. Moreover, using this additional reflector, one also additionally increases the contrast of the system.

Rotationally symmetrical ellipsoid reflectors have two conjugate focal points. The light from one focal point passes through the other focal point after reflection. Due to the ellipsoid design, it is possible to collect a substantially larger part of the total emitted light compared to spherical mirrors or conventional lens systems, which leads, inter alia, to a better light yield and an increased brightness value at the maximum of the light distribution. In addition, a space-saving geometry results, which is well-suited for the small installation space in a headlamp.

The motor vehicle headlamp according to the invention may be conceived for light functions such as for example a main beam, a partial main beam, a dipped beam, but also for auxiliary light functions or the like.

The arrangement according to the invention allows an efficient bundling of light beams to form a light beam bundle, wherein the light beam bundle can be shaped in a simple manner according to specified standards, and is projected in the radiation direction of the motor vehicle headlamp. The bundling can be adapted particularly well to specific radiation characteristics of certain light sources, such as semiconductor laser diodes for example. Thus, for example, for each design of the light source used, a respectively specifically adapted and correspondingly shaped reflector device with different dimensions or focal points of the ellipsoid can be used.

Due to the arrangement according to the invention, the collimator does not rest directly on the light source, as is conventional in the prior art. As a result, the collimator is thermally loaded less strongly and thus, it is for example possible to use polymethylmethacrylate (PMMA) as a material for the collimator instead of the Tarflon (polycarbonate, PC) otherwise conventional in the prior art. PMMA is less expensive and absorbs less light, as, in contrast to Tarflon (PC), it can be polished to a high gloss. Furthermore, due to the arrangement according to the invention, it is possible to use a smaller collimator, as a result of which material can be saved.

The projection system fed from the reflector system contains a collimator, an optical element, which effectively acts as a diaphragm, and a projection optical element, for example in the form of a projection lens, wherein the focal planes of the collimator and the projection lens coincide with the location of the diaphragm of the optical element. This structure makes it possible to trim the light image generated by the collimator in the focal plane in a suitable manner by means of the optical element, i.e. to shade certain regions, in order to then image the thus-trimmed light image using the projection optical element.

A few optional advantageous developments of the above-described invention are presented in the following:

It is beneficial if the at least one edge runs straight and is orientated substantially horizontally in an installation position of the headlamp in a vehicle. As a result, trimming of the projected light distribution can be achieved in a simple manner according to relevant standards.

It is particularly beneficial if the motor vehicle headlamp, particularly the optical element, has at least two edges, which run straight in each case and are arranged in such a manner in the beam path of the light beam bundle, that a cut-off line for a dipped-beam function of the motor vehicle headlamp can be created. As a result, trimming of the projected light distribution can be achieved in a simple manner according to relevant standards (e.g. SAE, ECE) for a dipped-beam function.

It is advantageous if the light source has at least one semiconductor light source, preferably at least one laser diode. A particularly high efficiency of the motor vehicle headlamp can be achieved by means of a combination of a laser light source with an ellipsoid reflector.

It is also advantageous if the motor vehicle headlamp further has a light conversion means, which is arranged in the beam path of the light beam bundle and is configured, when excited by the light beam bundle with a first wavelength range, to excite additionally at least one further light beam bundle with a second wavelength range which is different from the first. For example, by means of a combination of a laser light source emitting in the invisible UV range of the light spectrum with an ellipsoid reflector, a particularly high efficiency and illumination intensity of the motor vehicle headlamp can be achieved in combination with a corresponding light conversion means, which carries out a conversion of the invisible to a visible light spectrum.

It is beneficial if the ellipsoid reflector is constructed as a reflector curved in accordance with an ellipsoid of revolution (to be precise a part shell thereof). The light emitted by the light source can be shaped into a light beam bundle of desired type particularly effectively as a result.

A particularly inexpensive embodiment is created if the collimator is a TIR optical element.

In addition, it is beneficial if the collimator is formed by a collecting lens with a spacing contour, wherein the spacing contour defines a plane, which is located upstream of the collimator light entrance surface, in the collimator entrance focal length. As a result, a precise alignment between the collimator and for example a holder, on which the ellipsoid reflector is fastened, can be achieved in a simple manner.

In an advantageous development of the invention, the second focal point of the ellipsoid reflector is located in the plane of the spacing contour, as a result of which a particularly simple fastening to the ellipsoid reflector is possible.

It is further advantageous, if the projection optical element has at least one collection lens, as a result of which an inexpensive arrangement is created in a simple manner.

In a development of the invention, the optical element is a diaphragm and the diaphragm is configured to reflect a first part of the light beam bundle away from the projection optical element or to absorb a first part of the light beam bundle at the optical element, and to allow a second part of the light beam bundle to pass to the projection optical element at the at least one edge. As a result, the light beam bundle can be shaped in a simple manner to form the desired, projected light image in accordance with the requirements.

In this case, it may be advantageous if the optical element is arranged in a substantially vertically orientated manner in an installation position of the headlamp in a vehicle.

In an alternative development of the invention, the optical element is configured in such a manner that it contains a reflective component or particularly is a reflector, and the component/the reflector is configured to divert a first part of the light beam bundle to the projection optical element by means of a reflection at a surface of the optical element, and to allow a second part of the light beam bundle to pass at the at least one edge and at the projection optical element. As a result, the light beam bundle can be shaped in a simple manner to form the desired, projected light image in accordance with the requirements.

In this case, it may additionally be advantageous if the surface of the optical element is arranged to be orientated at an inclined angle with respect to the horizontal in an installation position of the headlamp in a vehicle, which inclined angle essentially lies in a range of 10° to 50°, preferably 20° to 40°, and particularly preferably is 30°.

In this case, it may also be advantageous if the first image plane intersects with the second image plane in a straight line, in which straight line, the at least one edge also lies.

The embodiments and developments of the invention mentioned can also be combined with one another.

It is clear to the person skilled in the art that a headlamp also contains many other parts, which are not mentioned and enable sensible use in a motor vehicle, such as a passenger car or motorcycle in particular, which parts are not detailed further for the sake of clarity.

The invention and further advantages are described in more detail in the following on the basis of non-limiting exemplary embodiments, which are shown in the attached drawings. In the drawings FIG. 1 shows a perspective, schematic view of an optical element of a motor vehicle headlamp with collimator and diaphragm, which corresponds to the prior art;

Exemplary embodiments of the invention are now explained in more detail with reference to FIGS. 2 to 8. In particular, important parts are illustrated for the invention in a headlamp, wherein it is clear that a headlamp also contains many other parts, which are not shown, which allow a sensible use in a motor vehicle, such as a passenger car or motorcycle in particular. Therefore, cooling devices for components, control electronics, further optical elements, mechanical adjustment devices or holders are for example not shown for the sake of clarity.

The orientations of components mentioned hereinafter relate to an installation position of the headlamp in a motor vehicle. Of course, other arrangements with other installation positions are also possible.

Figure 2:
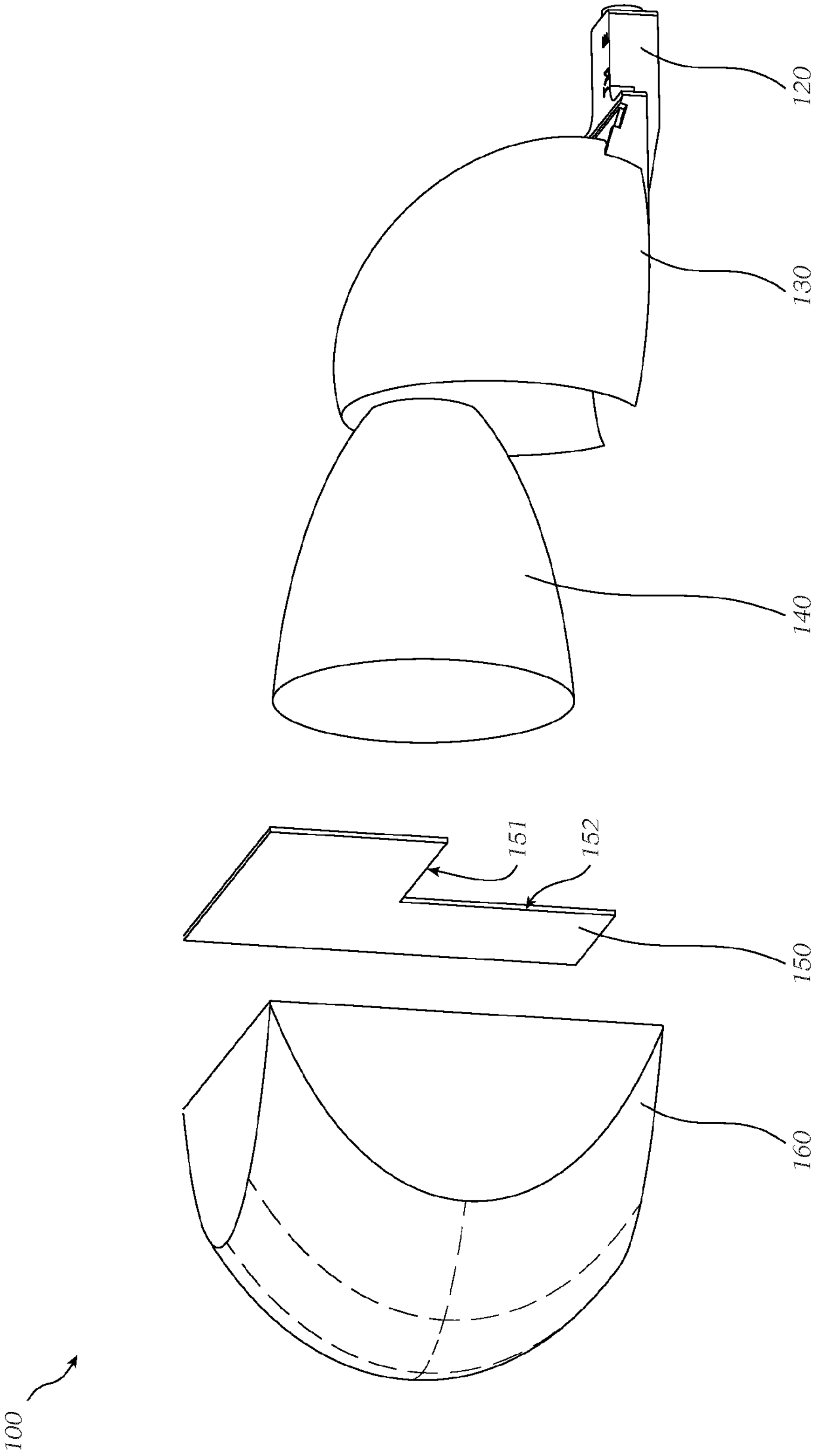
FIG. 2 shows a perspective, schematic view a first embodiment of the invention.
Figure 4:
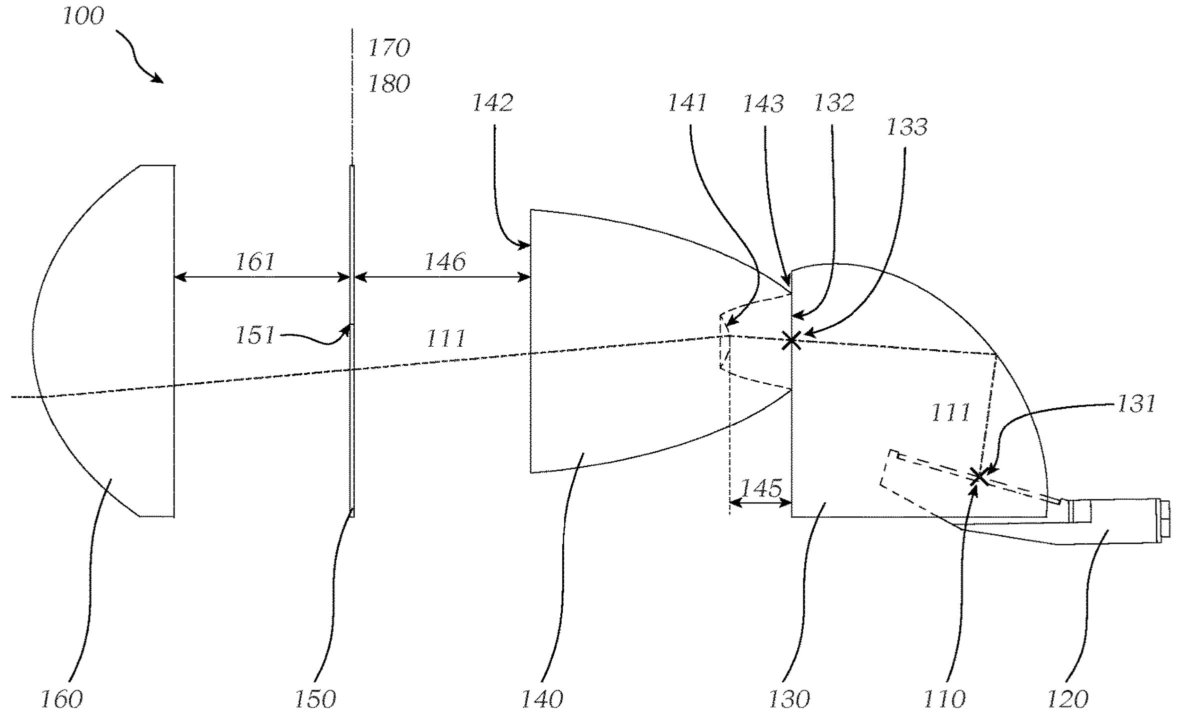
FIG. 4 shows a schematic side view of the first embodiment according to FIG. 2.

FIG. 2 and FIG. 4 show a first exemplary embodiment of a motor vehicle headlamp 100, comprising a light source 110, which is configured to emit light. The light source 110 is held in a light module 120 in a defined position, which can be adjusted if appropriate.

The light distribution which can be created is suitable for a partial main-beam function in particular.

Furthermore, an ellipsoid reflector 130 with a reflector light entrance point 131 is shown, in which the emitted light is coupled in, and a reflector light exit opening 132, the contour of which advantageously lies in a plane, which is orientated substantially vertically in the exemplary embodiment shown for example. The ellipsoid reflector 130 is configured to divert the light coupled in by the light source 110 in the direction of the reflector light exit opening 132. At the same time, the light is bundled by the second focal point of the reflector 130, as a result of which the light is shaped into a light beam bundle. Due to the bundling of the light into a focal point or a small region around the focal point, it is possible to use a collimator (as described in the following), which is designed for point light sources, without the actual light source 110 having to be arranged in the entrance focal point of the collimator; instead, a virtual light source is located in the entrance focal point, which virtual light source lies in the second focal point 133 of the reflector 130. Instead of the entire light beam bundle, only the path of a single light beam of the emitted light 111 is shown in the figures. This light beam represents the beam path in the headlamp shown.

The reflector light entrance point is beneficially chosen such that it substantially coincides with the first focal point of the ellipsoid. In the event that the light source cannot be considered point-like, e.g. if an areal phosphor of a laser light source is used, it is generally beneficial to position a brightest point of the areal light source in the focal point.

The light bundled by the second focal point 133 of the ellipsoid reflector 130 exits through the reflector light exit opening 132. Thus, a well-defined light beam bundle is created in this manner. The light beam bundle, which leaves the reflector 130 starting from the second focal point 133, has a large divergence, which is why additional optical elements, such as e.g. a collimator 140, are used beneficially in order to bundle the light further.

Preferably, a collimator 140 is provided, which has a collimator light entrance surface 141 and a collimator light exit surface 142, and a collimator entrance focal length 145 and a collimator exit focal length 146. A collimator entrance focal point lies at the distance of the collimator entrance focal length 145 from the central point of the collimator entrance surface 141, and a collimator exit focal point lies at the distance of the collimator exit focal length 146 from (the central point of) the collimator light exit surface 142.

A first image plane 170 lies in the collimator exit focal length 146. The collimator 140 can, as illustrated in the exemplary embodiment shown, further be configured to focus the incident light beam bundle from the ellipsoid reflector 130 and direct the same in the direction of the first image plane 170. A light image is shaped there, that is to say in the first image plane 170, by means of the collimator. To this end, it is beneficial if the second focal point of the reflector 130 lies in the collimator entrance focal point (entrance focal length 145).

A projection optical element 160 is located at a distance from the light image, which corresponds to the focal length (more precisely: entrance focal length) 161 of the projection optical element 160. The associated focal point of the entrance focal length 161 therefore lies in a second image plane 180, which coincides with the first image plane 170 in this exemplary embodiment. The projection optical element 160 is configured to project a light image, created by the light beam bundle and placed in the second image plane 180, in the radiation direction of the motor vehicle headlamp 100.

In general, the first and the second image plane 170, 180 intersect or overlap one another.

An optical element 150 with two optically active edges 151, 152 is arranged between the collimator 140 and the projection optical element 160 in the beam path of the light beam bundle. In the first exemplary embodiment, the optical element 150 is a diaphragm. The diaphragm 150 is described more precisely below.

The optical element 150 is configured to delimit the light beam bundle by means of the at least one optically active edge 151, 152, so that the light beam bundle partially reaches the projection optical element 160, i.e. partially to reflect or to absorb the light beam bundle, and partially to allow the light beam bundle to pass, and the optical element 150 is arranged in such a manner that the first and the second image plane 170, 180 lies on the optical element 150.

The two edges 151 and 152 (FIG. 2) run straight and the edge 151 is orientated substantially horizontally in an installation position of the motor vehicle headlamp in a vehicle, as the approval requirements and standards specify. The edges 151, 152 run at an angle to one another, which is specified according to the relevant standards (e.g. SAE or ECE). Depending on the standard, three edges or even more edges may for example also be necessary, in order to create a desired contour in a projected light image. It may also be expedient, if the edges are free-formed, that is to say do not run straight.

The motor vehicle headlamp may have two edges, which run straight in each case and are arranged in such a manner in the beam path of the light beam bundle, that a cut-off line for a dipped-beam function of the motor vehicle headlamp can be created.

The light source 110 has a semiconductor light source, which is preferably a laser diode.

Optionally, the motor vehicle headlamp 100 further has a light conversion means (not shown), which is arranged in the beam path of the light beam bundle and is set up, when excited by the light beam bundle with a first wavelength range, to excite additionally at least one further light beam bundle with a second wavelength range which is different from the first. This light conversion means can be used for converting an invisible light range to a visible light range, or else for a pure colour change of the light beam for example by adding red and green spectral portions by means of corresponding additional light beam bundles to a blue, originally exciting light beam bundle of a laser light beam, in order to additively create a white light beam bundle. This aspect is not illustrated in the figures.

The light conversion means may for example be arranged directly on the emitting surface of a laser light source, or on a surface of an optical lens.

The ellipsoid reflector 130 is a reflector in the shape of a triaxially curved ellipsoid. The shape of the ellipsoid reflector 130 may deviate punctually from the ellipsoid, however, in order for example to take account of an adaptation of radiation patterns of specific light sources, which may lead to an improvement of the light yield.

In the embodiment shown, the collimator 140 is formed by a total internal reflexion (TIR) optical element (e.g., TIR lens). As a result, the light yield may be increased further starting from the ellipsoid reflector 130. Of course, in design variants, other configurations of the collimator are possible and may make sense, depending on the use case.

The collimator 140 is for example formed as a collecting lens with a spacing contour 143, wherein the spacing contour 143 defines a plane in which the collimator entrance focal point (entrance focal length 141) is located.

The spacing contour 143 is preferably aligned in relation to the reflector light exit opening 132, for example in such a manner that its plane coincides with that of the reflector light exit opening 132. This is used e.g. to align the entrance focal point of the collimator with other parts of the headlamp 100 in a simple manner during the mounting of the headlamp 100. Thus, the spacing contour 143 may rest on a holder, which supports the ellipsoid reflector 130 for example, as a result of which the adjustment of the two optical elements 130 and 140 with respect to one another takes place.

The spacing contour 143 is preferably annular and arranged concentrically to the optical axis of the collimator. Other shapes of the spacing contour 143 adapted to specific holders are likewise possible, such as a three-point support, through which an imagined spacing contour runs, which defines a plane, through which the reflector light exit opening 132 also runs in the mounted state.

The projection optical element 160 is realized by means of a collecting lens in this example, but may for example also comprise light-conducting elements.

The optical element 150 is a diaphragm in this first exemplary embodiment, and is configured to reflect a first part of the light beam bundle away from the projection optical element 160 or to absorb a first part of the light beam bundle at the optical element 150, and to allow a second part of the light beam bundle to pass to the projection optical element 160 at the edges 151, 152.

The diaphragm 150 may be designed to be reflective or absorbing. For example, an absorbing coating may be applied on the surface of the diaphragm. In order to avoid undesired reflections due to single or multiple reflections in the headlamp 100 in the direction of the projection optical element 160, further surfaces inside the headlamp housing of the motor vehicle headlamp 100 may likewise be realized to be absorbing. It may also be sensible to design the diaphragm 150 to be reflective, for example by means of a mirrored surface of the diaphragm 150. The reflected light beams may for example be directed in a targeted fashion onto an absorbing point in the headlamp 100, in order to suppress undesired single or multiple reflections in the headlamp 100 in the direction of the projection optical element 160 in a targeted fashion; but light portions may also be diverted in such a manner that they contribute to the light image in the illuminated regions, as a result of which an increase in efficiency results.

The optical element 150 in the form of the diaphragm is arranged to be orientated substantially vertically in the installation position of the headlamp in a vehicle.

In this disclosure, "orientated substantially vertically" means an angular position (of the respective plane or diaphragm 150), which may deviate from the vertical by up to ±10°, preferably up to ±5°. The precise angular position is particularly relevant for the implementation of light functions, in which the edges 151, 152 have to be imaged sharply, for example in the case of a dipped-beam function with a cut-off line. In the case of other light functions, an angular position may be chosen, which can absolutely deviate from the vertical by up to ±25°.

The optical element 150 may also comprise a plurality of diaphragms, which are arranged in a rotatable manner in the form of a diaphragm shaft, wherein only one diaphragm of the diaphragm shaft is optically active or effective in the beam path of the light beam bundle in each case. The diaphragm shaft may realize a plurality of light functions, for example a dipped-beam or a main-beam function of the headlamp 100.

A rotatable diaphragm shaft preferably has an axis of rotation, which lies in the first or second image plane 170, 180.

In FIG. 4, a light beam 111 is shown by way of example, which light beam is emitted by the light source 110. Of course, the light source 110 emits further unbundled light beams, for example diffuse light, in a radiation pattern which is specific for the light source. The light beam 111 is coupled into the ellipsoid reflector 130 at the reflector light entrance point 131 (in the first focal point) and is reflected at the reflective surface, wherein it runs through the second focal point of the ellipsoid reflector 130 and is coupled out again at the reflector light exit opening 132. The reflector light entrance point 131 corresponds to the first focal point, in which the point-shaped light source 110 (or a location of the light source with highest intensity, as mentioned previously)

is positioned. A first bundling of the individual light beams of the emitted light takes place by means of the ellipsoid reflector 130 to form a light beam bundle.

The collimator 140 bundles the light beam bundle further and focusses it in the first, virtual image plane 170, in which the diaphragm 150 also lies.

The light beam bundle is projected by the projection optical element 160 out of the focal plane thereof, which forms the second imaginary image plane 180, in the radiation direction of the headlamp 100. Due to the arrangement of the diaphragm 150 and the two edges 151, 152 in the focal plane of the projection optical element 160, the contour, which is formed by the two edges 151, 152, is imaged sharply.

Figure 3:
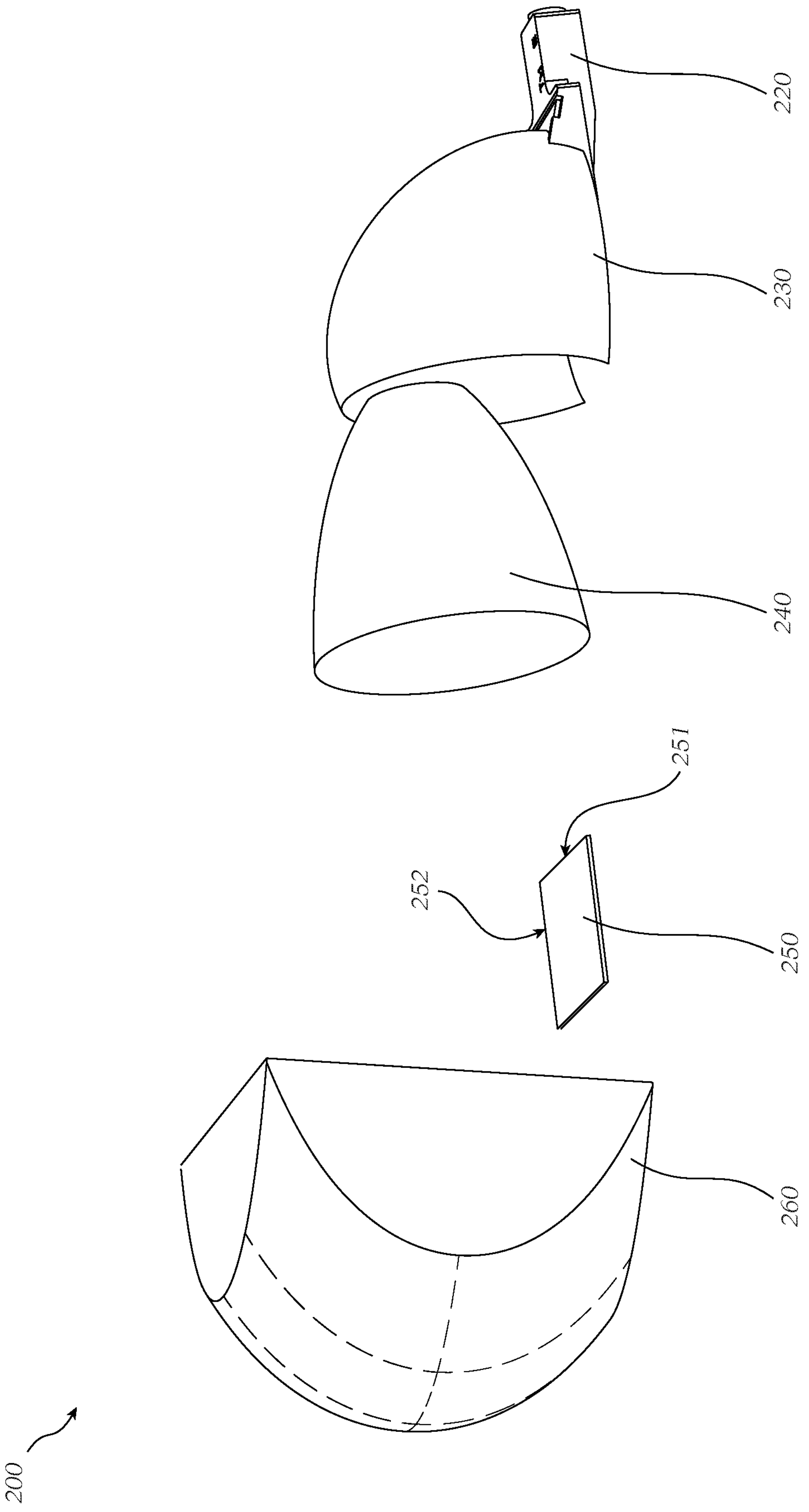
FIG. 3 shows a perspective, schematic view of a second embodiment of the invention.
Figure 5:
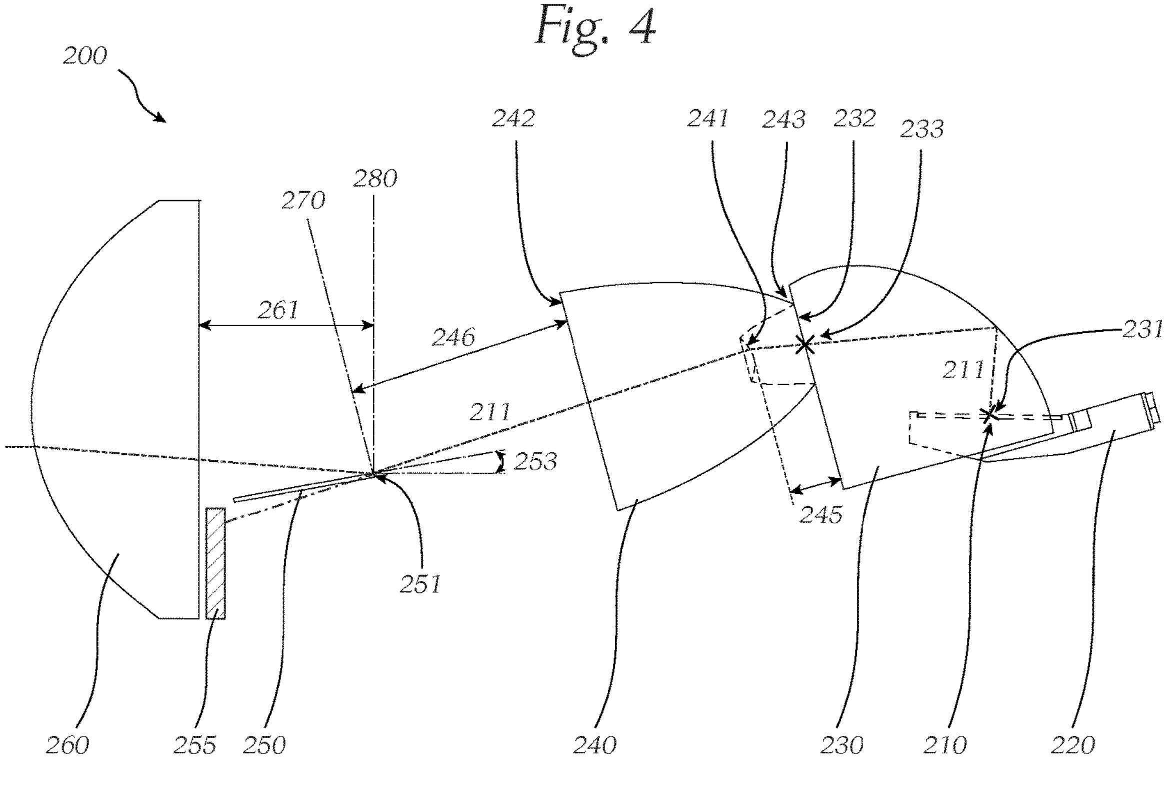
FIG. 5 shows a schematic side view of the second embodiment according to FIG. 3.

FIG. 3 and FIG. 5 show a second exemplary embodiment of a motor vehicle headlamp 200 according to the invention, wherein the difference from the first exemplary embodiment primarily lies in the optical element 250 containing a component realized as a reflector. The descriptions of the exemplary embodiment of FIGS. 2 and 4 applies in the same way for the second exemplary embodiment of FIGS. 3 and 5, insofar as nothing different emerges from the following, wherein respectively corresponding numbers with a leading number 2 (instead of a 1 for the reference numbers of the first exemplary embodiment) are used for reference numbers.

The reflector 250 has two edges 251 and 252 (FIG. 3) and is configured to divert the first part of the light beam bundle to the projection optical element 260 by means of a reflection on a surface of the optical element 250, and to allow a second part of the light beam bundle to pass at the two edges 251, 252 and at the projection optical element 160. In other words, the reflector 250 can influence the light beam bundle in such a manner that the light beam bundle is (only) partially conducted to the projection optical element 260.

The reflector 250 may for example be realized by a mirrored surface of the reflector 250. Those points in the headlamp 200 which are reached by the light beams let past at the reflector 250 may advantageously be realized to be absorbing for example in the form of a separate absorber component 255, in order to suppress undesired single or multiple reflections in the headlamp 200 in the direction of the projection optical element 260 in a targeted fashion. Likewise, an additional diaphragm (not shown) may be arranged on the inner surface of the projection optical element 260 in the headlamp 200, in order to suppress undesired reflections in the direction of the projection axis for example. Alternatively, a further mirror component could for example be arranged in the place of the absorber component 255, in order to divert the light beams at a point inside the headlamp, at which an absorption takes place.

In addition, the surface of the optical element 250 is arranged in the form of the reflector orientated at an inclined angle 253 with respect to the horizontal, which inclined angle essentially lies in a range of 10° to 50°, preferably 20° to 40°, and particularly preferably is 30°.

The first image plane 270 intersects with the second image plane 280 in a straight line, in which the edge 251 also lies.

The arrangement of the light source 210, the light module 220, the ellipsoid reflector 230 (including associated reflector light entrance point 231 and reflector light exit opening 232 and second focal point 233) and collimator 240 in the second exemplary embodiment corresponds to that of the first exemplary embodiment, however these components are slightly inclined compared to the first exemplary embodiment with respect to the projection optical element 260, in order to enable the reflection of the light beam bundle by the projection optical element 260 in an installation position beneficial for a motor vehicle headlamp 200.

The explanations with regards to the beam path of the light beam 211 on the one hand from the light source 110 through the reflector 230 to the collimator 240 and on the other hand from the projection optical element 260 to the outside of the headlamp 200, also with regards to the focal lengths 245, 246, 261 of the collimator and projection optical element, otherwise correspond to those of FIG. 4.

Since the reflector 250 only lies in a straight line in the focal plane of the projection optical element 260, namely in the line of intersection of the first and second image planes 270, 280, it may be advantageous if the edge 251 is placed in the straight line, as a result of which the contour, which is formed by the edge 251, is imaged sharply.

The other points of the reflector 250, like the edge 252, then cannot be imaged sharply, which is why this second embodiment of the invention cannot be used for all of the light functions mentioned.

An arrangement according to the invention according to the second embodiment is used for increasing the light yield for other light functions.

The reflector 250 can be arranged in a rotatably mounted manner, in order for example to realize a headlight height adjustment of the motor vehicle headlamp 200. In this case, the inclined angle 253 can for example be controlled or regulated manually or electronically by means of a vehicle system. The inclined angle 253 can preferably be rotated about the straight line, which lies in the line of intersection of the first and second image planes 270, 280.

Figure 8:
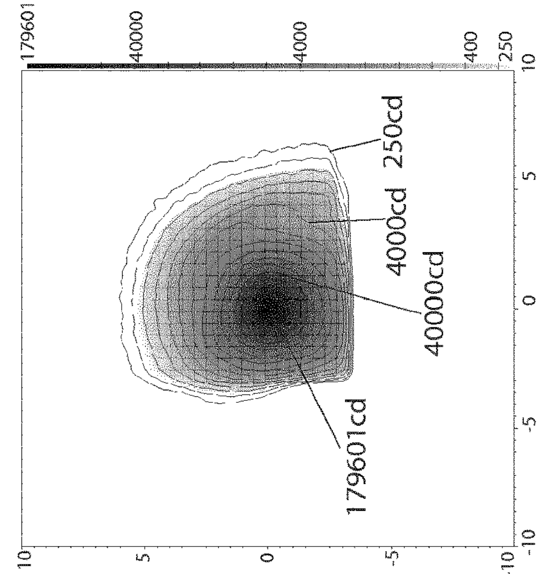
FIG. 8 illustrates a simulated light image of a laser partial main beam, which has been created for a headlamp optical element of the headlamp of FIG. 3.
Figure 7:
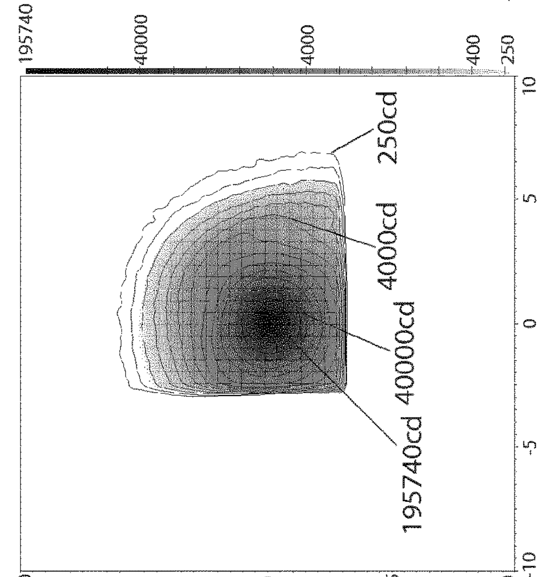
FIG. 7 illustrates a simulated light image of a laser partial main beam, which has been created for a headlamp optical element of the headlamp of FIG. 2.
Figure 6:
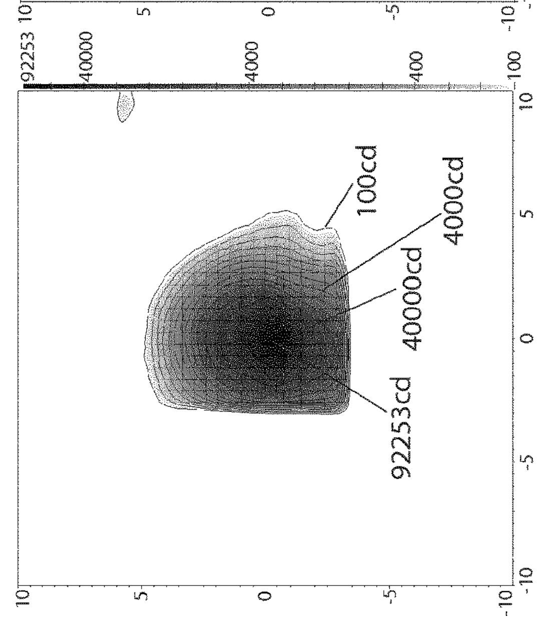
FIG. 6 illustrates a simulated light image of a laser partial main beam, which has been created for a headlamp optical element of the headlamp of FIG. 1 (prior art)

The particular usefulness of the invention can also be illustrated on the basis of FIGS. 6 to 8, which in each case show an exemplary light image according to a simulation of a light distribution for a partial main beam. The simulation was carried out on the part of the applicant in a computer-assisted manner for each of the headlamp optical elements shown in FIGS. 6-8, in order to obtain a simulated light image of the respective headlamp as a result. Each light image describes the solid-angle-based light distribution of the respective headlamp from the point of view of the driver, wherein the right-abscissa axis and height axis is in each case labelled in degrees according to the excursion from the centre of the image. The scale at the right edge of each light image illustrates the grey levels used in the intensity distribution, specified in cd [candelas].

For the sake of clarity, isolines of brightness are drawn in each case, wherein for a few isolines, the assigned brightness value in cd is additionally specified.

Figure 1:
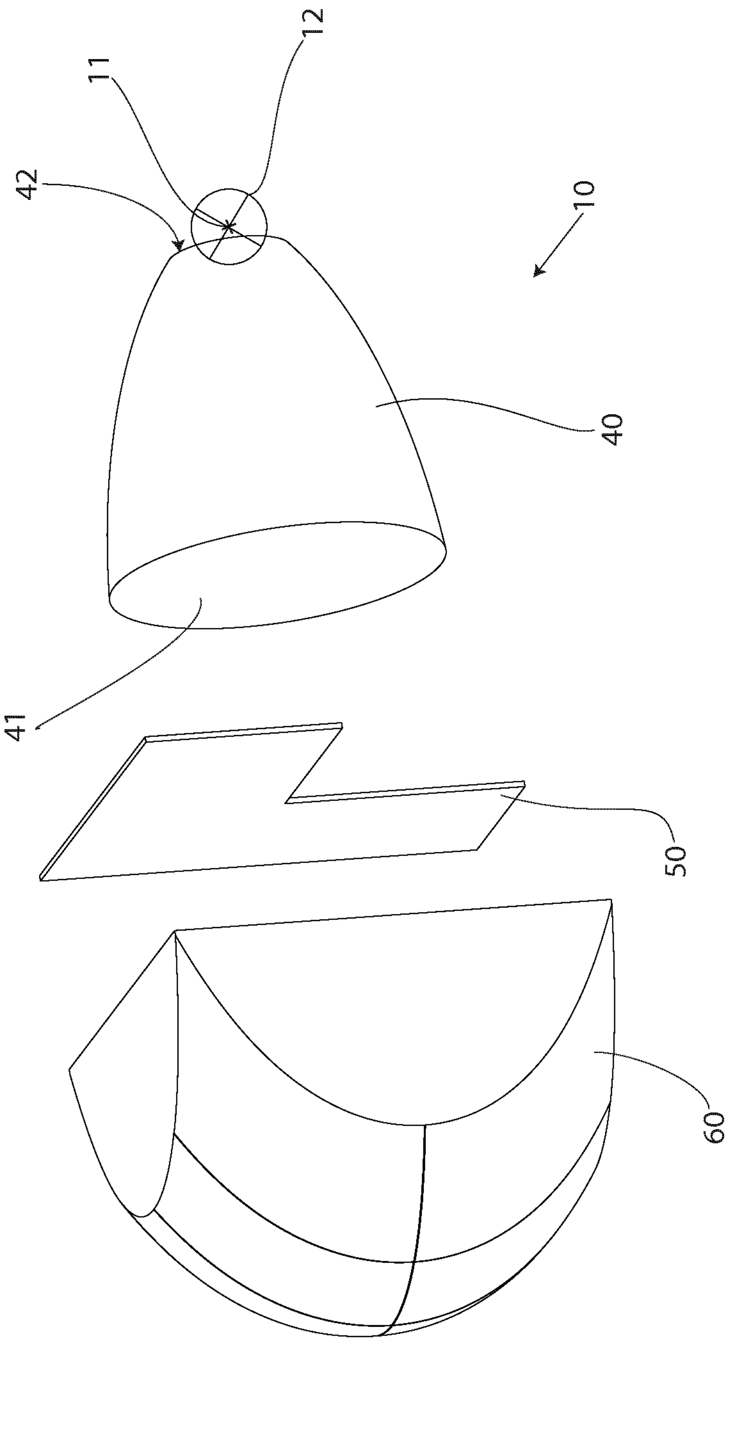

FIG. 6 shows a light image, which was created for a headlamp design according to FIG. 1, which corresponds to the prior art, i.e. using a collimator arranged directly downstream of the light source.

FIG. 7 shows a light image, which was created for the headlamp according to the invention of FIGS. 2 and 4, with an ellipsoid reflector according to the invention and collimator with a vertical diaphragm.

FIG. 8 shows a light image, which was created for the headlamp according to the invention of FIGS. 3 and 5, with an ellipsoid reflector according to the invention and with a diaphragm component acting as reflector.

On the basis of a comparison between the light distribution of FIG. 7 or 8 with that of FIG. 6, it can be seen that the system according to the invention with an ellipsoid reflector creates a light distribution (FIG. 7 or 8), which has a brightness maximum with a value approximately twice as high as that according to the prior art (FIG. 6) and which is additionally concentrated considerably better around the maximum.

LIST OF REFERENCE NUMBERS

10, 100, 200 Motor vehicle headlamp
11, 110, 210 Light source
111, 211 Light beam
12, 120, 220 Light module, light source holder
130, 230 Ellipsoid reflector
131, 231 Reflector light entrance point (first focal point)
132, 232 Reflector light exit opening
133, 233 Second focal point
40, 140, 240 Collimator
41, 141, 241 Light entrance surface
42, 142, 242 Light exit surface
143, 243 Spacing contour
50, 150 Optical element, diaphragm
151, 152, 251, 252 Edge
250 Optical element, reflector
253 Inclined angle
255 Absorber
60, 160, 260 Projection optical element
145, 245 Entrance focal length of the collimator
146, 246 Exit focal length of the collimator
161, 261 Entrance focal length of the projection optical element
170, 180, 270, 280 Image plane

The invention claimed is:

1. A motor vehicle headlamp (100, 200), comprising:
a light source (110, 210), configured to emit light;
an ellipsoid reflector (130, 230) having a first and a second focal point, wherein the ellipsoid reflector (130, 230) is configured to bundle the light coupled in from the light source (110, 210) via the first focal point (131, 231) to the second focal point and allow the light to exit through a reflector light exit opening (132, 232);
a collimator (140, 240), which has a collimator light entrance surface (141, 241) and a collimator light exit surface (142, 242), wherein the reflector light exit opening (132, 232) is arranged upstream of the collimator light entrance surface (141, 241) in an entrance focal length (145, 245) of the collimator, wherein a first image plane (170, 270) is assigned to the collimator in an exit focal length (146, 246) of the collimator, and wherein the collimator (140, 240) is configured to bundle the light exiting from the ellipsoid reflector (130, 230) in the direction of the first image plane (170, 270) to form a light beam bundle and to shape a light image there; and
a projection optical element (160, 260), to which a second image plane (180, 280) is assigned in an entrance focal length (161, 261), wherein the first image plane (170, 270) and the second image plane (180, 280) intersect or overlap one another, wherein the projection optical element (160, 260) is configured to project the light image in the radiation direction of the motor vehicle headlamp (100, 200),
wherein an optical element (150, 250) having at least one optically active edge (151, 152, 251, 252) is positioned in the beam path of the light beam bundle between the collimator (140, 240) and the projection optical element (160, 260), which optical element (150, 250) is configured to delimit the light beam bundle by means of the at least one optically active edge, so that the light beam bundle partially reaches the projection optical element (160, 260), and the optical element (150, 250) is arranged in such a manner that the first and/or the second image plane (170, 270, 180, 280) runs through the optical element (150, 250).

2. The motor vehicle headlamp (100, 200) according to claim 1, wherein the at least one edge (151, 251) runs straight and is orientated substantially horizontally.

3. The motor vehicle headlamp (100, 200) according to claim 1, wherein the motor vehicle headlamp (100, 200) or optical element (150, 250), comprises at least two edges, which each are straight and arranged in the beam path of the light beam bundle so as to enable creation of a cut-off line for a dipped-beam function of the motor vehicle headlamp (100, 200).

4. The motor vehicle headlamp (100, 200) according to claim 1, wherein the light source (110, 210) has at least one semiconductor light source.

5. The motor vehicle headlamp (100, 200) according to claim 4, wherein the at least one semiconductor light source comprises at least one laser diode.

6. The motor vehicle headlamp (100, 200) according to claim 1, further comprising a light conversion means, which is arranged in the beam path of the light beam bundle and is configured, when excited by the light beam bundle with a first wavelength range, to excite additionally at least one further light beam bundle with a second wavelength range which is different from the first.

7. The motor vehicle headlamp (100, 200) according to claim 1, wherein the ellipsoid reflector (130, 230) is constructed as a reflector shell curved in accordance with an ellipsoid of revolution.

8. The motor vehicle headlamp (100, 200) according to claim 1, wherein the collimator (140, 240) is a TIR optical element.

9. The motor vehicle headlamp (100, 200) according to claim 1, wherein the collimator (140, 240) is formed by a collecting lens with a spacing contour (143, 243), wherein the spacing contour (143, 243) defines a plane located upstream of the collimator light entrance surface at the collimator entrance focal length (141, 241).

10. The motor vehicle headlamp (100, 200) according to claim 9, wherein the second focal point of the ellipsoid reflector is located in the plane of the spacing contour (143, 243).

11. The motor vehicle headlamp (100, 200) according to claim 1, wherein the projection optical element (160, 260) comprises at least one collection lens.

12. The motor vehicle headlamp (100) according to claim 1, wherein the optical element (150) is a diaphragm and is configured to reflect a first part of the light beam bundle away from the projection optical element (160) or to absorb a first part of the light beam bundle at the optical element (150), and to allow a second part of the light beam bundle to pass to the projection optical element (160) at the at least one edge (151, 152).

13. The motor vehicle headlamp (100) according to claim 12, wherein the optical element (150) is arranged substantially vertically orientated.

14. The motor vehicle headlamp (200) according to claim 1, wherein the optical element (250) has a reflective component and is configured to divert the first part of the light beam bundle to the projection optical element (260) by means of a reflection at a surface of the optical element (250), and to allow a second part of the light beam bundle to pass at the at least one edge (251, 252) and at the projection optical element (160).

15. The motor vehicle headlamp (200) according to claim 14, wherein the surface of the optical element (250) is arranged orientated at an inclined angle (253) with respect to the horizontal, which inclined angle essentially is in a range of 10° to 50°.

16. The motor vehicle headlamp (200) according to claim 15, wherein the inclined angle is in a range of 20° to 40°.

17. The motor vehicle headlamp (200) according to claim 15, wherein the inclined angle is at 30°.

18. The motor vehicle headlamp (200) according to claim 14, wherein the first image plane (270) intersects with the second image plane (280) in a straight line, with which also the at least one edge (251) coincides.

* * * * *